US008887302B2

(12) United States Patent
Dalcher

(10) Patent No.: US 8,887,302 B2
(45) Date of Patent: *Nov. 11, 2014

(54) SYSTEM, METHOD AND COMPUTER PROGRAM PRODUCT FOR UTILIZING CODE STORED IN A PROTECTED AREA OF MEMORY FOR SECURING AN ASSOCIATED SYSTEM

(71) Applicant: McAfee, Inc., Santa Clara, CA (US)

(72) Inventor: Gregory William Dalcher, Tigard, OR (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/966,105

(22) Filed: Aug. 13, 2013

(65) Prior Publication Data

US 2013/0339646 A1   Dec. 19, 2013

Related U.S. Application Data

(63) Continuation of application No. 11/673,762, filed on Feb. 12, 2007, now Pat. No. 8,561,204.

(51) Int. Cl.
| | |
|---|---|
| *G06F 21/00* | (2013.01) |
| *G06F 12/14* | (2006.01) |
| *G06F 21/60* | (2013.01) |
| *G06F 21/57* | (2013.01) |
| *G06F 21/55* | (2013.01) |

(52) U.S. Cl.
CPC ............ *G06F 12/1458* (2013.01); *G06F 21/60* (2013.01); *G06F 21/572* (2013.01); *G06F 21/55* (2013.01)
USPC .......................................................... 726/27

(58) Field of Classification Search
None
See application file for complete search history.

(56) References Cited

U.S. PATENT DOCUMENTS

| | | | |
|---|---|---|---|
| 6,684,329 B1 | 1/2004 | Epstein et al. | |
| 6,986,052 B1 | 1/2006 | Mittal | |
| 7,496,727 B1 | 2/2009 | Ludloff et al. | |
| 8,561,204 B1 * | 10/2013 | Dalcher | 726/27 |
| 2001/0037450 A1 | 11/2001 | Metlitski et al. | |
| 2002/0073316 A1 | 6/2002 | Collins et al. | |
| 2002/0162024 A1 | 10/2002 | Cunchon et al. | |
| 2002/0178271 A1 | 11/2002 | Graham et al. | |
| 2004/0117658 A1 | 6/2004 | Klaes | |
| 2004/0158730 A1 | 8/2004 | Sarkar | |
| 2005/0091486 A1 | 4/2005 | Avraham et al. | |
| 2005/0091516 A1 | 4/2005 | Mcdermott | |
| 2005/0188210 A1 | 8/2005 | Perlin et al. | |
| 2006/0021032 A1 | 1/2006 | Challener et al. | |
| 2006/0090084 A1 | 4/2006 | Buer | |
| 2006/0284632 A1 | 12/2006 | Braverman et al. | |
| 2007/0011736 A1 | 1/2007 | Kalibjian et al. | |
| 2007/0074192 A1 | 3/2007 | Geisinger | |
| 2007/0271610 A1 | 11/2007 | Grobman | |
| 2008/0109903 A1 | 5/2008 | Werner et al. | |

OTHER PUBLICATIONS

Fernandes Victor, "WindowSecurity.com: Proxy Instalation",http://www.windowsecurity.com/whitepapers/Proxyinstalation.html, Feb. 7, 2007, 12 pp.

* cited by examiner

*Primary Examiner* — David Pearson
(74) *Attorney, Agent, or Firm* — Wong, Cabello, Lutch, Rutherford & Brucculeri, LLP

(57) ABSTRACT

A security system, method, and computer program product are provided. In use, code is stored in a protected area of memory. In addition, the stored code is utilized for securing a system associated with the protected area of memory.

25 Claims, 4 Drawing Sheets

SYSTEM, METHOD AND COMPUTER PROGRAM PRODUCT FOR UTILIZING CODE STORED IN A PROTECTED AREA OF MEMORY FOR SECURING AN ASSOCIATED SYSTEM

FIELD OF THE INVENTION

The present invention relates to securing computer systems, and more particularly to securing systems utilizing computer code.

BACKGROUND

Increasingly, computer systems have needed to protect themselves against unwanted code and related attacks. Such unwanted code has generally taken the form of viruses, worms, Trojan horses, spyware, adware, and so forth. In addition, such unwanted code is often injected by a person that intrudes upon a target network. The damage and/or inconvenience capable of being incurred by these types of unwanted code has ranged from mild interference with a program, such as the display of an unwanted political message in a dialog box, to the complete destruction of contents on a hard drive, and even the theft of personal information.

In order to combat such attacks, various security systems have been developed. In some instances, security systems operate within the context of the computer systems being protected. However, such security systems are often susceptible to being monitored and even interfered with by unwanted code.

There is thus a need for overcoming these and/or other issues associated with the prior art.

SUMMARY

A security system, method, and computer program product are provided. In use, code is stored in a protected area of memory. In addition, the stored code is utilized for securing a system associated with the protected area of memory.

DETAILED DESCRIPTION

Figure 1:
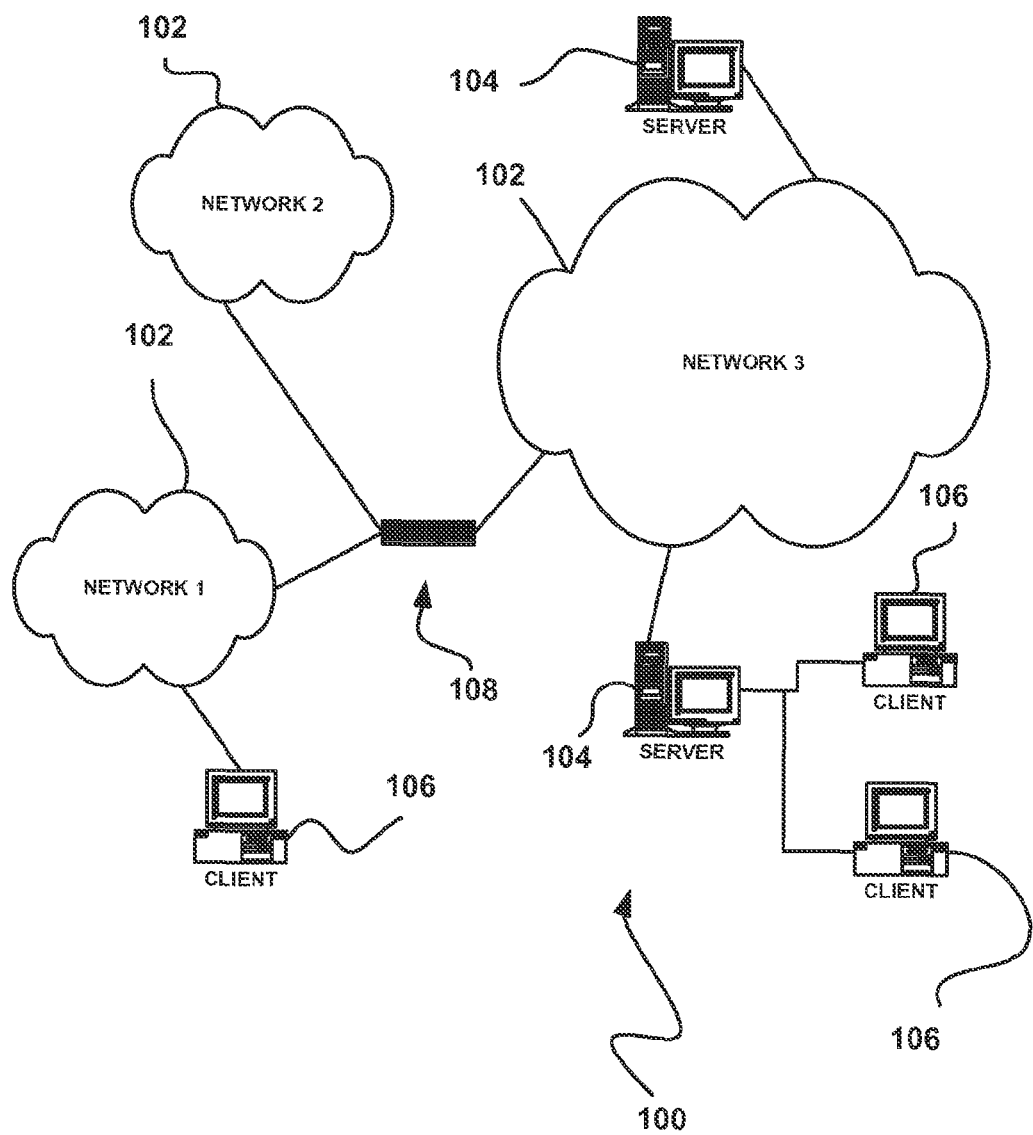
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
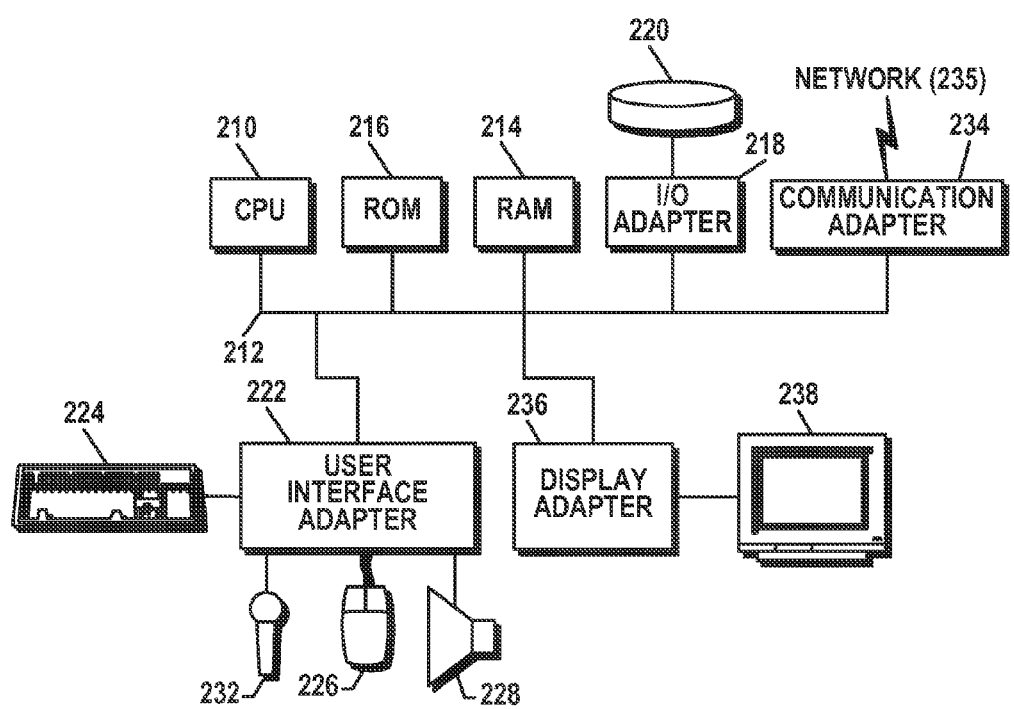
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
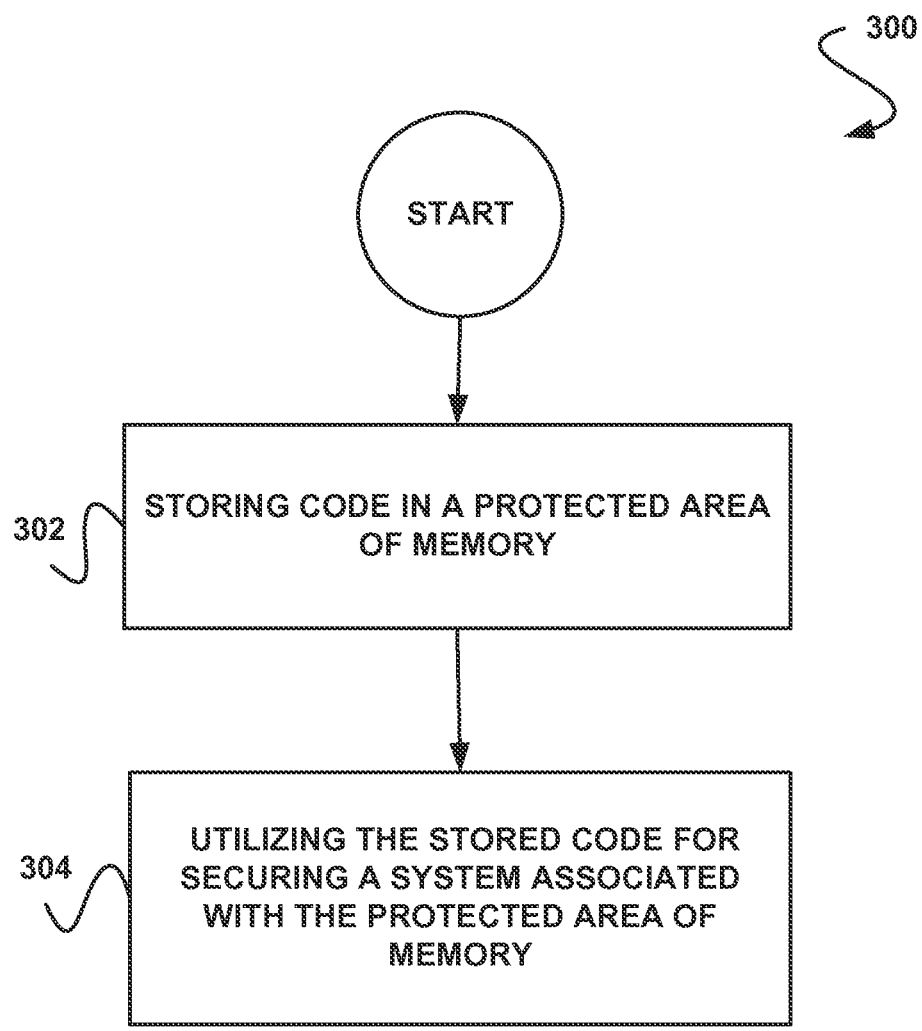
FIG. 3 shows a method for utilizing code stored in a protected area of memory for securing a system associated with the protected area of memory, in accordance with another embodiment.

FIG. 3 shows a method 300 for utilizing code stored in a protected area of memory for securing a system associated with the protected area of memory, in accordance with another embodiment. As an option, the method 300 may be carried out in the context of the architecture and environment of FIGS. 1 and/or 2. Of course, however, the method 300 may be carried out in any desired environment.

As shown in operation 302, code is stored in a protected area of memory. In the context of the present description, the protected area of memory may include any memory that is capable of being protected within a system. In various embodiments, such system may include, for example, any of the servers and/or computers described above with respect to FIGS. 1 and/or 2, an operation system, and/or any other system capable of storing code in a protected area of memory. The system further includes a system being secured utilizing the code stored in the protected area of memory, as described below.

Thus, for example, the protected area of memory may be included within the system. Moreover, the memory in which the protected area is located may include any computer readable medium. For example, the memory may include Random-Access Memory (RAM), Read-Only Memory (ROM), a hard disk, etc.

In one embodiment, the area of memory may be protected by controlling access thereto. For example, such access may include read requests, write requests, execute requests, etc. In addition, access may be controlled by blocking access for threads and/or processes, by only allowing access for predefined threads and/or processes, and/or in any other manner capable of controlling access to the protected area of memory. Of course, however, the area of memory may be protected in any desired manner.

Furthermore, in the context of the present embodiment, the code may include any code capable of being utilized for securing the system associated with the protected area of memory. In one embodiment, the code may include code associated with a security system (e.g. host intrusion protection system, monitoring system, data leakage prevention system, etc.). In another embodiment, the code may include a gateway (e.g. interface, proxy, etc.) capable of allowing a security system external thereto to secure the system associated with the protected area of memory. Just by way of example, the security system may be located outside of the system associated with the protected area of memory, within the system associated with the protected area of memory but outside of the protected area of memory, etc.

Still yet, as shown in operation 304, the stored code is utilized for securing the system associated with the protected area of memory. In one embodiment, the system may be secured by securing code, data, etc. within the system that is stored outside of the protected area of memory. In other optional embodiments, securing the system may include detecting unwanted code (e.g. malware, viruses, unwanted content, etc.), monitoring at least one aspect associated with the system (e.g. processes, invoked interfaces, etc.), preventing data leakage, etc. In various embodiments, such unwanted code may include code existing within an executable image (e.g. application, device driver, etc.), code hidden as a rogue thread of execution, a portion of allocated memory invoked by hidden stack frames, etc.

Further, the stored code may be utilized in any desired manner for securing the system associated with the protected area of memory. In one embodiment, the stored code may communicate (e.g. transmit data, etc.) with a security system external to the protected area of memory. Optionally, such security system may be included in the system being secured by the stored code. Such communication may include providing data (e.g. statistics, calls to interfaces and/or any other data capable of being correlated with the system associated with the protected area of memory) to the security system. In another embodiment, the stored code may directly secure the system associated with the protected area of memory (e.g. where the stored code includes a security system, etc.).

Thus, code may be utilized for securing a system, where such code is stored within a protected area of memory of the system. In this way, stored code utilized for securing the system may be protected, but may also be capable of accessing any processes, threads, resources, application program interfaces (API's) etc. associated with the system. To this end, the stored code utilized for securing the system may be provided access to code and/or data within the system, while being protected from potential interference (e.g. disabling, halting, modifying, terminating, etc.) therewith and/or monitoring thereof by unwanted code (e.g. malware, etc.).

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
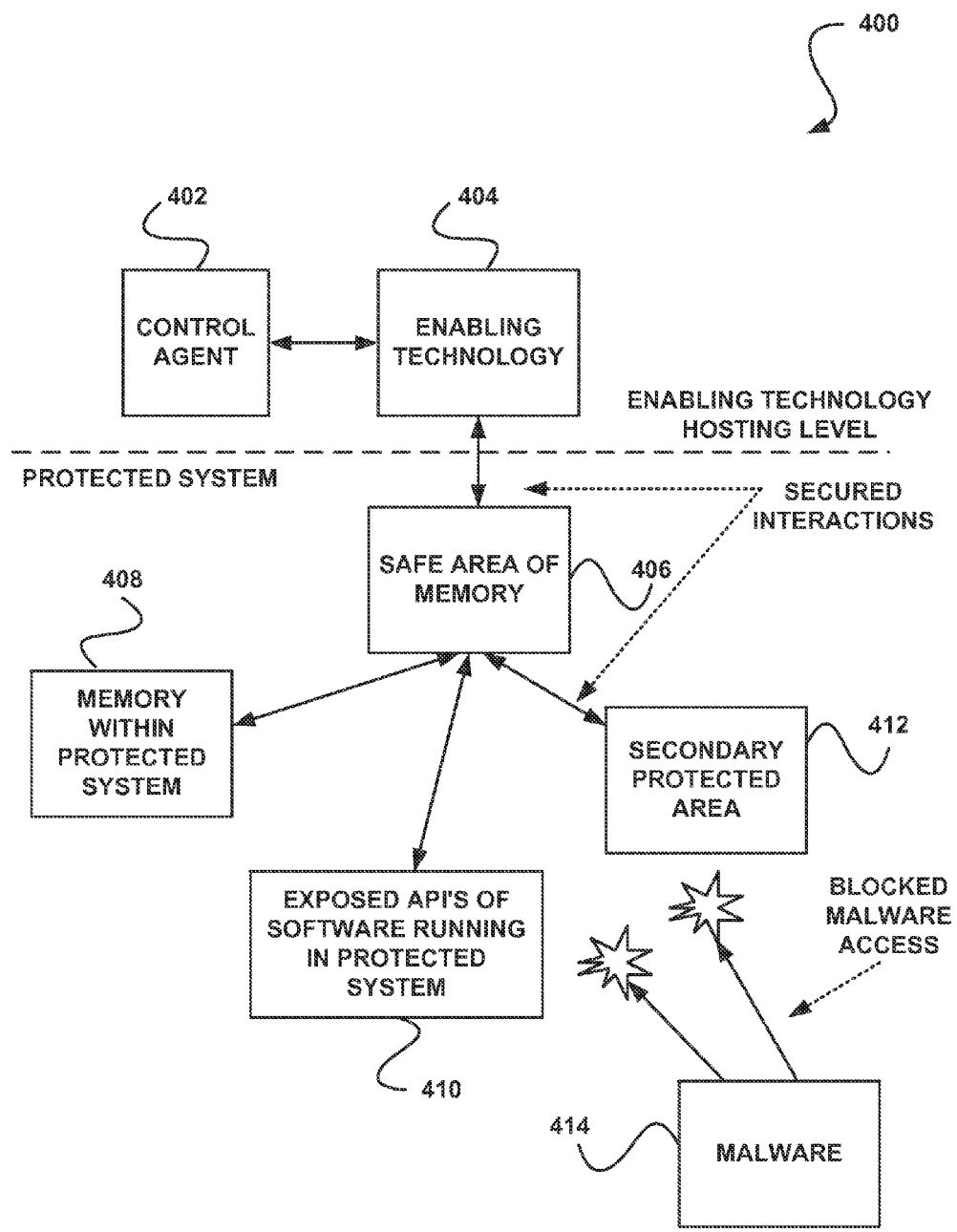
FIG. 4 shows a system for utilizing code stored in a protected area of memory for securing a system associated with the protected area of memory, in accordance with yet another embodiment.

FIG. 4 shows a system 400 for utilizing code stored in a protected area of memory for securing a system associated with the protected area of memory, in accordance with yet another embodiment. As an option, the system 400 may be implemented in the context of the architecture and environment of FIGS. 1-3. Of course, however, the system 400 may be implemented in any desired environment. It should also be noted that the aforementioned definitions may apply during the present description As shown, a control agent 402 and enabling technology 404 are located at an enabling technology hosting level. The enabling technology hosting level may include any level of hardware and/or software that is capable of being implemented separate from a protected system, as shown. In the context of the present embodiment, the protected system may include any system being secured (e.g. protected) from unwanted code. In one embodiment, the protected system may optionally include an operating system. Thus, in one exemplary embodiment, code may execute at the enabling technology hosting level without consequence to and/or effect from the protected system.

Additionally, the enabling technology 404 included in the enabling technology hosting level may be implemented in any desired manner. In various embodiments, the enabling technology 404 may be implemented utilizing a virtual machine, a central processing unit (CPU) extension and/or any other hardware extension, a bios extension, etc. To this end, the enabling technology 404 may provide an environment separate from the protected system for executing code.

For example, in one embodiment, the virtual machine may include a representation of a software and/or hardware execution environment. Optionally, the virtual machine may be utilized such that code executing therein is unaware that it is not running natively on hardware of an associated computer system. The virtual machine may include hardware (e.g. virtual host) where software providing the virtual machine executes. Moreover, the virtual machine may utilize instances thereof (e.g. virtual guest) for running different types (e.g. versions, etc.) of operating systems. Such instances may optionally be self-contained, such that a plurality of instances of the virtual machine may be implemented simultaneously.

In use, the enabling technology 404 may prevent read requests, write requests, execute requests and/or any other types of access to memory by any thread, process, etc., and may additionally identify any threads, processes, etc. currently executing. In this way, the enabling technology 404 may monitor memory. For example, the enabling technology 404 may provide monitoring of memory within the protected system with little overhead. In the context of the present embodiment, such memory may include a safe area of memory 406, as described below.

Further, the enabling technology 404 may provide callbacks (e.g. predefined functions invoked based on an occurrence of a predetermined event). In one embodiment, a callback may be invoked when a predetermined memory region is accessed. Just by way of example, a callback which notifies registered software may be invoked when monitored memory is accessed (e.g. read, write, execute, etc.), when a specific CPU instruction is executed and/or in response to any other specified event. In optional embodiments, the registered software that receives callbacks may be running within the protected system, but may also be running outside of such protected system.

Still yet, the callbacks provided by the enabling technology 404 may be synchronous, may provide for pre and post monitoring of operations, may allow for an inspection of data and parameters associated with such operations, may modify such data and parameters, and/or may fail such operations based on any desired conditions. Moreover, registered (e.g. predefined, etc.) callbacks may also be modified during runtime, utilizing the enabling technology 404. Additionally, the enabling technology 404 may allow memory pages to be directly viewed such that the view thereof is protected from being interfered with (e.g. altered, spoofed, etc.) by unwanted code (e.g. malware 414, etc.).

Further, the enabling technology 404 may initiate execution of code within the safe area of memory 406. Thus, the safe area of memory 406 may be enabled and/or protected via the enabling technology 404. The safe area of memory 406 may include any area of memory located within a protected system that is capable of being secured from interference of and/or monitoring by unwanted code associated with the protected system. The safe area of memory may be used to store both executable code and data. Optionally, the safe area of memory 406 may be unaware of the enabling technology hosting level described above. In addition, the execution of the code within the safe area of memory 406 may be initiated based on any desired condition. For example, execution of the code within the safe area of memory 406 may be initiated in response to a predefined event (e.g. timing interval, etc.), and/or in response to access to a specific memory area (e.g. implemented utilizing a registered callback for memory access monitoring, etc.).

As also shown, the control agent 402 is in communication with the enabling technology 404. The control agent 402 may include any code capable of communicating with the enabling technology 404. In addition, the control agent 402 may include code capable of controlling the safe area of memory 406 via the enabling technology 404, as described below. Furthermore, by implementing the control agent 402 at the enabling technology hosting level, the control agent 402 may be incapable of being interfered with (e.g. bypassed, etc.) via unwanted code.

In one embodiment, the control agent 402 may be capable of communicating with the safe area of memory 406 via the enabling technology 404. In various embodiments, the control agent 402 may install, remove, upgrade, etc. the safe area of memory 406. Additionally, the control agent 402 may initiate and/or terminate execution of code within the safe area of memory 406. Further, the control agent 402 may optionally invoke code within the safe area of memory 406 based on predetermined conditions (e.g. periodic time intervals, etc.).

As yet a further option, the control agent 402 may receive information from the safe area of memory 406. In one embodiment, such information may include notification events, such as notifications to be sent to an administrator by the control agent 402 indicating unwanted code. Just by way of example, the notification events may identify interference and/or monitoring of a particular process.

In one example, the safe area of memory 406 may be protected by controlling access (e.g. read, write, execute, etc.) thereto. Such access may be controlled via the enabling technology 404, for example. In optional embodiments, access may be controlled by blocking all access requests initiated by threads (and/or processes) of the protected system, by only allowing access requests associated with predetermined threads, etc. As yet another option, access may be controlled by responding to an access request with code (and/or data) that is different than the code requested to be accessed [e.g. showing a no operation (NOP) in place the requested code, etc.]. In this way, code within the safe area of memory 406 may be masked.

As shown, interactions (e.g. communications, etc.) between the enabling technology 404 and the safe area of memory 406 are secure. In one embodiment, such interactions may be secure by controlling access to the safe area of memory 406, as described above. In another embodiment, interactions between the enabling technology 406 and the safe area of memory 406 may be secure by only allowing the code in the safe area of memory 406 to execute in response to initiation of such execution by the enabling technology 404. Accordingly, the protected system may be blocked from initiating and/or controlling execution of the code within the safe area of memory 406. As a further option, the protected system may also be unaware of any execution of the code within the safe area of memory 406.

Various optional modes may be utilized for executing code within the safe area of memory 406. In one optional mode, threads (and/or processes) may be prevented from initiating the execution of the code within the safe area of memory 406. For example, such threads may be prevented from initiating such code by blocking access thereto utilizing the enabling technology 404, as described above. In one embodiment, the code within the protected area of memory 406 may only be executed via a registered callback by the enabling technology 404. For example, the enabling technology 406 may control a CPU associated with the protected system and may transfer execution to the safe area of memory 406. Thus, execution of the code in the safe area of memory 406 may not necessarily be prevented by any thread running within the protected system. In this way, the safe area of memory 406 may be inaccessible to any thread running within the protected system, including for example operating system threads, therefore providing maximum protection to and control of the safe area of memory 406.

In another optional mode, the code within the safe area of memory 406 may be executed within a thread (and/or process) running within the protected system. In one embodiment, such thread may include a predetermined thread. In another embodiment, the thread may include a thread recognized by the protected system. Still yet, the thread may be arbitrary, such as a thread executed in response to an event external to the protected system (e.g. a predetermined time interval identified by the enabling technology 404, etc.). The thread may also be executed in response to an event taking place within the protected system. Such event may include the invocation of a monitored portion of memory, as an option. To this end, the code within the safe area of memory 406 may execute in the context of the thread that triggered the event. To this end, allowing the code within the safe area of memory 406 to be initiated via a thread may more effectively allow invocation of API's within the protected system (e.g. API's associated with software running within the protected system, etc.). More information regarding the invocation of API's within the protected system will be described below.

Furthermore, controlling the execution of the code within the safe area of memory 406 may allow such execution to be initiated and complete without interference by any code within the protected system (e.g. operating system software, etc.). In one optional embodiment, CPU task switches (e.g. page-fault handling, etc.) may be prevented from temporarily and/or permanently removing control from the execution of the code in the safe area of memory 406. In another embodiment, only page-fault handling and/or hardware interrupts may be allowed to remove control from the execution of the code in the safe area of memory 406. Of course, it should be noted that the execution of the code in the safe area of memory 406 may be controlled in any desired manner.

Still yet, the code within the safe area of memory 406 may execute within the protected system, as shown, while maintaining protection thereof utilizing access controls, as described above. For example, the safe area of memory 406 may be allocated by calls to the protected system. Thus, the code within the safe area of memory 406 may view and/or interact with threads, processes, resources, etc. associated with the protected system.

Moreover, the safe area of memory 406 may be capable of receiving a secure view of the protected system (e.g. memory of the protected system, etc.). For example, such view may include input and/or output used by code running within the safe area of memory 406, which may be prevented from being modified and/or otherwise interfered with by unwanted code. In one embodiment, the enabling technology 404 may provide the unaltered view of the protected system. In another embodiment, the unaltered view may be provided utilizing at least one API (e.g. single API and/or API set) invoked by the safe area of memory 406. Such API may further be utilized for facilitating modification of the safe area of memory 406 by the enabling technology 404 without allowing unwanted code to alter and/or otherwise interfere with such modification.

In this way, the enabling technology 406 may provide the viewing and/or modifying of memory without allowing unwanted code within the protected system to monitor and/or alter such viewing and/or modifications. Optionally, results of any modification made to the protected area of memory 406 may be visible, based on a level of protection associated with the protected area of memory 406.

As also shown, the safe area of memory 406 may view and/or modify memory 408 within the protected system that is outside of the safe area of memory 406. Such memory 408 may include any memory that is outside of the protected area of memory 406 but which is within the protected system. Optionally, interactions with such memory 408 may not necessarily be secured.

As further shown, the safe area of memory 406 may invoke API's 410 within the protected system that are located outside of the safe area of memory 406. In this way, the code within the safe area of memory 406 may be capable of utilizing functionality of an operating system, software, etc. provided by such API's 410. As an option, such functionality may facilitate examination of threads, processes, access to file data, and/or any other information capable of being associated with the protected system.

The safe area of memory 406 may securely invoke the API's 410, thus reducing exposure of the safe area of memory 406 to potential interference by unwanted code. In one embodiment, code associated with an API 410, such as, for example, code within an executable module (e.g. dynamically loaded library, etc.) providing the API 410, may be invoked for examination and validation thereof. For example, an unaltered memory image of the code associated with the API 410 may be provided by the enabling mechanism 404, as described above, for examination. Optionally, the contents of such memory image may be compared (e.g. utilizing a checksum, etc.) with expected contents of the code. Accordingly, code associated with the API 410 may be validated.

In another embodiment, control transfer instructions (e.g. hooks, etc.) associated with the invocation of the API 410 may be monitored. As an option, such monitoring may be performed utilizing the enabling technology 404, as described above. Further, the monitoring may be enabled prior to invocation of the API 410 by the safe area of memory 406 and/or disabled in response to the completion of the invocation of the API 410. As another option, the monitoring may be enabled only for a thread utilized for invoking the API 410 (e.g. if the safe area of memory 406 is running within the thread, etc.), or may also be invoked only for control transfer instructions occurring outside of a thread (e.g. directly via the enabling technology 404). In this way, it may be determined whether invocation of the API 410 unexpectedly deviates from a predefined pattern, such as, for example, via execution transfers into memory outside of code providing the API 410.

As also shown, code and/or data within the protected system that is outside of the safe area of memory 406 may also be secured (i.e. secondary protected area 412). In one embodiment, code and/or data within the secondary protected area 412 may optionally be initialized by the safe area of memory 406. To this end, the code and/or data within the secondary protected area 412 may be recognized by the safe area of memory 406. For example, the initialization may include allocating memory within the protected system and invoking processes and/or threads for executing code within the secondary protected area 412. Such initialization may be secured by validating the code and/or data within the secondary protected area 412, in a manner similar to that described above with respect to the controlled execution of API's 410 that are outside of the safe area of memory 406 but within the protected system.

In another embodiment, the safe area of memory 406 may perform a checksum of the code in the secondary protected area 412. The checksum may be performed periodically, when a secure API associated with the safe area of memory 406 is invoked, and/or at any other desired time. For example, the safe area of memory 406 may compare a current checksum of the code in the second protected area 412 with a previously stored checksum of such code. As an option, the previously stored checksum may include a checksum identified during initialization of the code in the secondary protected area 412. Also, the code in the secondary protected area 412 may be accessed by the safe area of memory 406 utilizing the enabling technology 404, such that the view of the code provided to the safe area of memory 406 is prevented from being altered and/or otherwise interfered with. If it is determined that the current checksum of the code in the second protected area 412 does not match a previous checksum of such code, a notification event may optionally be communicated to the control agent 402 from the safe area of memory 406.

In a further optional embodiment, code within the safe area of memory 406 may be unreadable by the secondary protected area 412. For example, the code within the safe area of memory 406 may be encoded. Thus, the safe area of memory 406 may be required to format the associated code in a format readable by the secondary protected area 412 in order for such secondary protected area 412 to access such code.

In yet another embodiment, the code in the secondary protected area 412 may be secured by providing a secure API for use by the secondary protected area 412. Such secure API may include an API exported by the safe area of memory 406. In addition, only recognized code may be capable of invoking the secure API, as an option. In one optional embodiment, a thread (and/or process) invoking the secure API may be verified against a list of predetermined threads recognized as valid for the secondary protected area 412. The thread invoking the secure API may be identified utilizing the enabling technology 404. In another optional embodiment, it may be verified that a return stack of the API invocation only points to within code recognized to be part of code of the secondary protected area 412. Further, a checksum of such code may be performed at each invocation of the secure API, as described above. Still yet, a notification event may be communicated to the control agent 402 from the safe area of memory 406 if invocation of the API is performed by unrecognized code, etc. Additionally, invocation of the API may optionally be prevented.

The secure API may also provide verifiable updating of the code in the secondary protected area 412. In one embodiment, the secondary protected area 412 may invoke the secure API for access of protected code associated therewith, such that an update may be performed on such protected code. Furthermore, the secondary protected area 412 may call the secure API (and/or a different secure API) to commit the updated code. The safe area of memory 406 may optionally perform a checksum on the updated code and store such checksum. In this way, an updated checksum of the updated code may be identified for utilization in subsequent checksum comparisons.

Moreover, communications from the secondary protected area 412 may be performed utilizing the secure API. The invocation of such secure API may be verified, and code utilized by the secondary protected area 412 may also be verified, as described above. Thus, communication between the secondary protected area 412 and the safe area of memory 406 may be secured.

Still yet, execution of the code within the secondary protected area 412 may also be protected. In one embodiment, such execution may include execution of the code initiated by the safe area of memory 406. For example, the safe area of memory 406 may validate the execution by monitoring of CPU instructions via the enabling technology 404. In this way, the safe area of memory 406 may identify all control transfer instructions occurring within the secondary protected area 412, and may further verify that the target of each control transfer instruction resides within the secondary protected area 412. Optionally, execution of a return (RET) instruction that transfers control back to the safe area of memory 406 may be valid if the target of such RET instruction is an expected area within the safe area of memory 406 (e.g. the instruction following the invocation of the code of the secondary protected area 412).

In addition, communication from the safe area of memory 406 to the secondary protected area 412 may also be secured. For example, such communication may be performed by the safe area of memory 402 invoking code within the secondary protected area 412. In one optional embodiment, such communication may be secured utilizing a secure API, as described above. Of course it should be noted that while secured communications from the safe area of memory 406 to the secondary protected area of memory 412 have been described herein, it should be noted that communications originated from the secondary protected area 412 to the safe area of memory 406 may similarly be secured. Just by way of example, the safe area of memory 406 may secure communications by verifying that a call address is associated with the secondary protected area 412.

Further, communications to and from the safe area of memory 406 may be secured (e.g. prevented from interference and/or monitoring of unwanted code, etc.). Accordingly, consumers (e.g. intrusion detection systems, etc.) running outside of the protected system (e.g. at the enabling technology hosting level, etc.) and/or within the protected system (e.g. at the secondary protected area 412, etc.) may be provided with secure communications with respect to the safe area of memory 406. In addition, such consumers may also optionally utilize such communications for controlling the code executing within the safe area of memory 406.

In one embodiment, communications from the safe area of memory 406 to consumers running outside the protected system at the enabling technology hosting level may be facilitated by the enabling technology 404. For example, such communications may be secured by controlling access to the safe area of memory 406, as described above. To this end, consumers may exist in a region of memory inherently safe from interference and/or monitoring by unwanted code within the protected system, but may access the protected system via the safe area of memory 406.

In another embodiment, communications from the safe area of memory 406 to consumers running within the protected system may also be secured. Optionally, such communications may be secured as described above with respect to the secondary protected area 412 described above. In this way, the consumer may be secured utilizing the safe area of memory 406, such that the consumer may be protected from being detected and/or interfered with by unwanted code.

Thus, a safe area in memory 406 may be provided within a system being protected, but may be secured from interference and/or monitoring by unwanted code. Accordingly, the safe area of memory 406 may act as a proxy that securely runs within the context of system being protected. To this end, access to the protected system may be facilitated while still protecting code utilized for securing such system.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    storing code in a protected area of memory in a protected system comprising a protected system environment,
    controlling read, write, and execute access to the protected area of memory utilizing a control agent separated from the protected system environment via enabling technology that provides an environment for executing code separate from the protected system environment;
    initiating execution on the protected system, by the control agent, of at least a portion of the stored code; and
    securing, by the control agent, code and data stored within the protected system outside the protected area of memory utilizing the at least a portion of the stored code.

2. The method of claim 1, wherein the enabling technology is implemented using a virtual machine.

3. The method of claim 1, wherein the enabling technology is implemented using a processor chipset extension.

4. The method of claim 1, wherein the enabling technology is implemented in a basic input output system (BIOS) extension.

5. The method of claim 1, wherein the protected system comprises an operating system and code can execute utilizing the enabling technology without being affected by code executing under control of the operating system.

6. The method of claim 1, wherein the enabling technology monitors memory outside the protected area of memory within the protected system.

7. The method of claim 6, wherein the enabling technology provides one or more callback functions based on access to the monitored memory.

8. The method of claim 1, wherein the enabling technology provides one or more callback functions invoked based on an occurrence of a predetermined event.

9. The method of claim 8, wherein the one or more callback functions are invoked for execution within the protected system.

10. The method of claim 8, wherein the one or more callback functions are invoked for execution outside the protected system.

11. A non-transitory computer readable storage medium comprising executable instructions stored thereon that when executed by one or more processors cause one or more of the processors to:
- access stored code in a protected area of memory in a protected system comprising a protected system environment,
- control read, write, and execute access to the protected area of memory utilizing a control agent separated from the protected system environment via enabling technology that provides an environment for executing code separate from the protected system environment;
- initiate execution on the protected system, by the control agent, of at least a portion of the stored code; and
- secure, by the control agent, code and data stored within the protected system outside the protected area of memory utilizing the at least a portion of the stored code.

12. The non-transitory computer readable storage medium of claim 11, wherein the enabling technology is implemented using one or more of a processor chipset extension, a basic input output system (BIOS) extension, or a virtual machine.

13. The non-transitory computer readable storage medium of claim 11, wherein the protected system comprises an operating system and code can execute with the enabling technology without being affected by code executing under control of the operating system.

14. The non-transitory computer readable storage medium of claim 11, wherein the enabling technology monitors memory within the protected system and separate from the protected area of memory.

15. The non-transitory computer readable storage medium of claim 14, wherein the enabling technology provides one or more callback functions based on access to the monitored memory.

16. The non-transitory computer readable storage medium of claim 11, wherein the enabling technology provides one or more callback functions invoked based on an occurrence of a predetermined event.

17. The non-transitory computer readable storage medium of claim 16, wherein the one or more callback functions is invoked for execution within the protected system.

18. The non-transitory computer readable storage medium of claim 16, wherein the one or more callback functions is invoked for execution outside the protected system.

19. A system, comprising:
- a central processing unit;
- one or more logical or physical portions of memory communicatively coupled to the central processing unit; and
- a computer readable storage device, wherein the computer readable storage device stores instructions to configure the system to interface with an enabling technology logically or physically separate from the system, the enabling technology operable to:
  - access stored code in the one or more logical or physical portions of memory considered protected areas of memory in the system, wherein read, write, and execute access to at least one of the protected areas of memory is controlled utilizing a control agent separated from a protected system environment via enabling technology, the enabling technology providing an environment for executing code separate from the protected system environment;
  - initiate execution on the system, by the control agent, of at least a portion of the stored code, the system comprising the protected system environment; and
  - secure, by the control agent, code and data stored outside the protected areas of memory and within the system utilizing the at least a portion of the stored code.

20. The system of claim 19, wherein the enabling technology is implemented using one or more of a processor chipset extension, a basic input output system (BIOS) extension, or a virtual machine.

21. The system of claim 19, wherein the system comprises an operating system and code can execute at a hosting level of the enabling technology without being affected by code executing under control of the operating system of the system.

22. The system of claim 19, wherein the enabling technology monitors memory within the system and separate from the protected areas of memory.

23. The system of claim 22, wherein the enabling technology provides one or more callback functions based on access to the monitored memory.

24. The system of claim 19, wherein the enabling technology provides one or more callback functions invoked based on an occurrence of a predetermined event.

25. The system of claim 24, wherein the one or more callback functions is invoked for execution outside the system.

* * * * *